United States Patent
Grader et al.

(10) Patent No.: US 6,602,449 B1
(45) Date of Patent: Aug. 5, 2003

(54) METHOD OF PRODUCING CERAMIC FOAMS

(75) Inventors: Gideon Grader, Haifa (IL); Gennady Shter, Ramat Yitzhak (IL); Yoram Dehazan, Kibbutz Dalia (IL)

(73) Assignee: Cellaris Limited, Nesher (IL)

( * ) Notice: Subject to any disclaimer, the term of this patent is extended or adjusted under 35 U.S.C. 154(b) by 0 days.

(21) Appl. No.: 09/647,211

(22) PCT Filed: Mar. 17, 1999

(86) PCT No.: PCT/IL99/00150
§ 371 (c)(1),
(2), (4) Date: Sep. 28, 2000

(87) PCT Pub. No.: WO99/51541
PCT Pub. Date: Oct. 14, 1999

(30) Foreign Application Priority Data

Apr. 6, 1998 (IL) ................................. 123969
Aug. 19, 1998 (IL) ................................. 125855

(51) Int. Cl.$^7$ .......................... C04B 38/00; B29C 65/00
(52) U.S. Cl. .......................... 264/43; 264/621; 501/80; 501/85
(58) Field of Search ............................ 501/12, 80, 85; 264/41, 42, 43, 413, 414, 425, 621

(56) References Cited

U.S. PATENT DOCUMENTS

| | | |
|---|---|---|
| 4,356,271 A | 10/1982 | Francis et al. |
| 4,610,832 A | 9/1986 | Brockmeyer |
| 4,871,694 A | 10/1989 | Legare |
| 4,889,670 A | 12/1989 | Gurak et al. |
| 4,997,694 A | 3/1991 | Legare |
| 5,039,340 A | 8/1991 | Hargus et al. |
| 5,061,660 A | 10/1991 | Park et al. |
| 5,063,007 A | 11/1991 | Gabathuler et al. |
| 5,077,241 A | 12/1991 | Moh et al. |
| 5,124,364 A | 6/1992 | Wolff et al. |
| 5,185,297 A | 2/1993 | Park et al. |
| 5,268,199 A | 12/1993 | Brown et al. |
| 5,306,555 A | 4/1994 | Ramamurthi et al. |
| 5,849,406 A | 12/1998 | Daws |

FOREIGN PATENT DOCUMENTS

| | | |
|---|---|---|
| EP | 261070 B1 | 5/1992 |
| JP | 6144951 A | 5/1994 |
| JP | 8239280 A | 9/1996 |
| JP | 10025174 | 1/1998 |

OTHER PUBLICATIONS

S. Acosta, P. Arnal, R. J.P. Corriu, D. Leclerg, P.H. Nutin & A. Vioux, "A General Nonhydrolytic Sol–Gel Route to Oxides", "Better Ceramics Throuth Chemistry VI", Editors: A.K. Cheethem et al., Mat. Res. Symp. Proc. 346, p. 43–54, (1994).

T. Fujiu, G.L. Messing & W. Huebner, "Processing and Properties of Cellular Silica Synthesized by Foaming Sol–Gel", J. Am. Ceram. Soc. 73, (1) 85–90, (1990).

M. Wu & G.L. Messing, "SIC–Whisker–Reinforced Cellular $SiO_2$ Composites", J.AM. Ceram. Soc. 73 (11) 3497–99, (1990).

P. Seoykvedam "Gelcasting Foams for Porous Ceramics", The American Ceramic Society Bulletin, 76, No. 10, Oct., 61–65 (1997).

G.S. Garder, Y. DeHazan & Y. Cohen, D. Bravo–Zhivotovskii, "Effect of Aging on Nonhydrolytic Alumina Xerogels", Journal of Sol–Gel Science and Technology 10, 5–12, & 127–137 (1997).

G.S. Grader, G.E. Shter, & Y. DeHazan, "Novel Ceramic–Foams from Crystals of $AlCl_3$ ($Pri_2$ O) Complex", J. Mater. Res.14, No. 4, 1485–1494, (1999).

P. Colombo, M. Griffoni & M. Modesti, "Ceramic Foams from a Preceramic Polymer and Polyurethanes: Preparation and Morphological Investigations", Journal of Sol–Gel Science and Technology, 13, 195–199 (1998).

G.S. Grader, G.E. Shter, & Y. DeHazan, "Microstructure Ecolution of Nonhydrolytec Alumina Gels", Journal of Sol–Gel Science and Technology 10, 5–12, (1997).

*Primary Examiner*—Christopher A. Fiorilla
(74) *Attorney, Agent, or Firm*—Eugene C. Rzucidlo

(57) ABSTRACT

A method of producing ceramic foam wherein a precursor including an $AlCl_3$ ($Pr'_2O$) complex is decomposed to form a mixture of a polymerizing species and liquid isopropyl chloride and the mixture is foamed. The foamed mixture is sintered and/or calcined to produce a ceramic foam.

16 Claims, 6 Drawing Sheets

METHOD OF PRODUCING CERAMIC FOAMS

This application is a 371 of PCT/IL99/00150 Mar. 17, 1999.

FIELD OF THE INVENTION

The present invention relates to ceramic foams and, more specifically, to a method of producing ceramic foams by liberating volatile reaction products during an inorganic gelation process.

BACKGROUND OF THE INVENTION

Organic foams are commonly made by introducing a blowing agent (e.g., a supercritical fluid such as $CO_2$ or freon) into a polymer. The polymer is subjected to a rapid pressure drop which causes the blowing agent to form bubbles in the polymer. This process creates a solid containing gas bubbles—namely a foam.

Ceramic foams may be constructed from a variety of materials and may be used in various applications such as thermal insulation, separation processes, catalysis and low dielectric constant materials. In simplified terms, a ceramic foam is a foam where the solid phase is composed of a ceramic material.

The most common method of producing a ceramic foam involves the impregnation of an organic polymer foam (e.g., polyurethane) with a ceramic slurry. The coated organic polymer is dried, then the organic phase burned off. After a sintering step, the resulting ceramic foam is a replica of the original organic precursor.

Another method of producing a ceramic foam, named high internal phase emulsion ("HIPE") involves the preparation of a concentrated emulsion containing a continues phase of a polymerizing monomer (e.g., sodium silicate) that is dispersed in a pore-forming phase (e.g., petroleum spirit) with the aid of a surfactant. The continues phase is stabilized by polymerization, washed, and then dried to obtain the foam.

Both of the methods described above produce open-cell ceramic foams. However, these methods do not use the combination of a gas and a liquid phase that is used in blowing agent foam production methods.

Cellular silica and SiC whisker-reinforced cellular silica have been produced using physical blowing agents incorporated into a ceramic suspension. (see Fujiu et al., J. Am. Ceram. Soc., vol. 73, pp 85–90 (1990) and Wu et al., J. Am. Ceram. Soc., vol. 73, pp. 3497–3499 (1990), respectively). This process uses a stabilized aqueous suspension of colloidal silica. The blowing agent is dispersed as small liquid droplets in the suspension with the aid of a surfactant and methanol. The pH of the suspension is adjusted to cause gelation, which is accompanied with a rapid viscosity increase. At this stage, the temperature is raised above the boiling point of the blowing agent thereby producing bubbles in the gel and giving rise to the foam. The duration of the viscosity increase and the setting temperature must be carefully monitored at this stage in order to prevent foam collapse.

In another ceramic foam process (P. Sepulveda, Am. Cer. Soc. Bull., 76, 61–65 (1997)), the foam structure is stabilized by the polymerization of organic monomers incorporated into to the ceramic powder suspension. Initiator and catalyst are added to the system after the foaming stage to induce the polymerization of the organic monomer and the setting of the porous structure.

The above methods have several drawbacks. Most of these methods involve a series of steps (e.g., forming the starting compound, adding blowing agents, etc.). This complicates and increases the cost of the foam manufacturing process. Furthermore, the foams produced thus far often have a 70–90% porosity. Accordingly, a need exists for an improved method of producing ceramic foams, with the option of increasing the pore fraction.

SUMMARY OF THE INVENTION

The invention provides a new process for foaming ceramic foams. Significantly, the ceramic foams are produced from a precursor that has an internal blowing mechanism which is activated during gelation. The precursor or mixture of precursors contains at least one ceramic-forming element and liberates at least one volatile reaction product during an inorganic gelation process.

In one embodiment, foaming is based on a precursor containing crystals of the $AlCl_3(Pr^i_2O)$ complex. The decomposition of the initial precursor produces polymerizing species dissolved in liquid isopropyl chloride. As long as the solvent and growing $AlO_xCl_y(OPr^i)_z$ species are mixed homogeneously, the boiling point of the solution is raised above the boiling point of the pure isopropyl chloride (35.4° C. at 1 atm). Polymerization takes place in the liquid until a critical polymer size is attained, whereupon a phase separation into a polymer rich and solvent rich regions occurs. Since the expelled solvent is suddenly above its boiling point, bubbles start forming instantly. Foam stabilization takes place as a result of gelation in the polymer rich regions which comprise the cell walls in the foam. The net result of the process is then a gelled ultra light foam.

Acceleration of the process is achieved by a mild heating of the precursor (T<100° C.), but foaming can also take place at room temperature. The heating also affects the cell size, with larger cells produced at lower temperatures. The simplicity of the process is due to the precursor which contains all the necessary foaming functions.

In another embodiment, the mixture of precursors consists of aluminum sec-butoxide and silicon tetrachloride in solution. Upon heating, the solution releases a volatile component (sec-butylchloride) while condensation of $AlO_x Si_y Cl_z (OR)_n$ species takes place (—OR is the sec-butoxide oxygen donor). As before, the volatile component serves as the blowing agent that creates a foam during the gelation process The internal blowing mechanism activated during inorganic gelation reactions constitutes the major difference between these processes and conventional processes used to make cellular ceramics. In addition, this fact also explains the inherent simplicity of the process, which can start with a single precursor. The foaming, gelling and drying stages take place simultaneously.

In contrast to other processes (e.g., HIPE, foaming of ceramic slurries), no mechanical stirring is required at the liquid phase due to the homogeneous nucleation of the chemical blowing agent in the method of the invention. This enables the convenient production of thick or thin foamed films from the liquid phase and allows simple in situ preparation of monolithic foams in complicated shapes by a one step procedure. Moreover, the method is simpler than the other methods since it may be self-regulating. Furthermore, the method may produce foams that have significantly higher porosity than conventional cellular ceramics.

In another embodiment, the precursor is placed in a pressure vessel and then the precursor is heated and pressurized to accelerate the transformation of the complex to a solution of isopropyl chloride and partially condensed Al—O—Al species. In addition, foaming is carried out under pressure; and then the pressure vessel is depressurized. The depressurizing causes either the breaking down of the walls of the foam and/or the expansion the walls of the foam and the creation of new cells. The foam is stabilized by gelation. Furthermore, the step of inducing foaming occurs by depressurizing.

Finally, a method for manufacture of a thermal or acoustic insulator is provided. The method includes the steps of foaming a precursor includes a $AlCl_3(Pr^i_2O)$ complex or crystals thereof, heating the precursor, dissolution of the precursor decomposition products in isoproyl chloride, cooling the solution to control the condensation reaction thereby to delay foaming; and spraying the solution on to a surface or into an open atmosphere.

The step of pressurizing the solution can occur prior to the step of spraying.

The step of spraying Includes the spraying onto a hot surface, a cold surface or in a hot atmosphere.

BRIEF DESCRIPTION OF THE DRAWINGS

These and other features of the invention will become apparent from the following description and claims, when taken with the accompanying drawings, wherein similar references characters refer to similar elements throughout and in which:

DESCRIPTION OF EXEMPLARY EMBODIMENTS

Described below are several experiments that illustrate methods of producing ceramic foams from a precursor or a mixture of precursors. Each of these precursors contains a ceramic-forming element. In accordance with the invention, the precursor (or mixture of precursors) liberates at least one volatile reaction product during an inorganic gelation process. The experiments described below are for illustration purposes. However, the invention is not limited to these particular forms.

Figure 1:
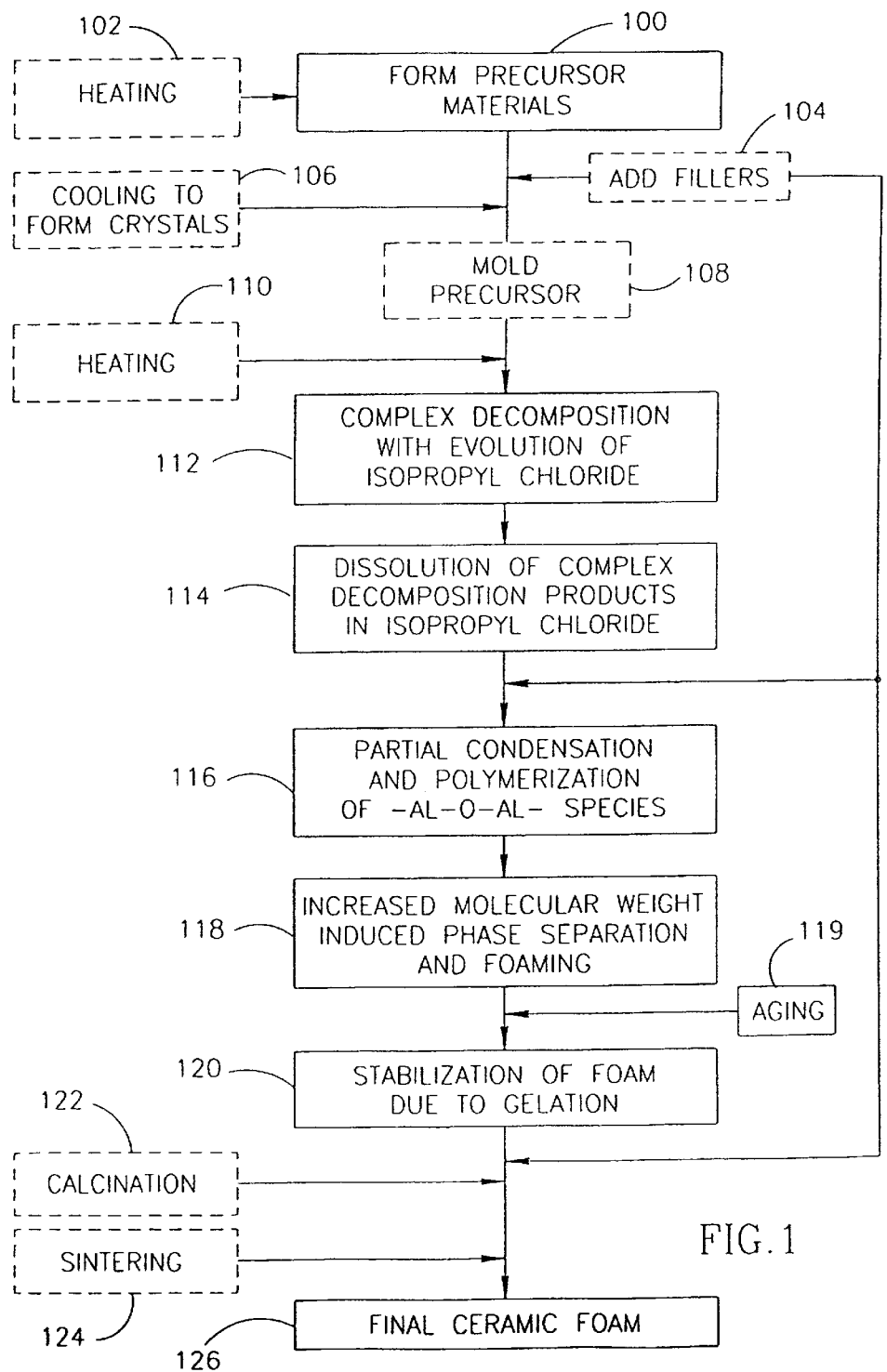
FIG. 1 is a flowchart illustrating foaming operations according to one embodiment of the invention.

FIG. 1 summarizes the stages involved in the mechanism of foam formation from the crystals of the $AlCl_3(Pr^i_2O)$ complex. Several optional processes are represented by dashed boxes. The details of these and the other steps in the process are discussed later.

The process of FIG. 1 may utilize crystals of the $AlCl_3(Pr^i_2O)$ complex as the only precursor (blocks 100, 102 and 106). Controlled heating is the only "force" acting on the system. The heating accelerates the transformation of the crystals to a ceramic foam and changes the cell size.

Upon heating the crystals of the $AlCl_3(Pr^i_2O)$ complex (block 110), isopropyl chloride is liberated, forming the solvent of the system (block 112). Increased solubility of the aluminum species in the isopropyl chloride is resulted by the formation of isopropoxy side groups generated by the same reaction (block 114). Full solubilization of the aluminum species is achieved into a clear, highly concentrated sol. Due to the high content of aluminum species, the boiling of the sol at temperatures significantly higher than the normal boiling point of isopropyl chloride is inhibited. Homogeneous polymerization yielding an Al—O—Al network takes place (block 116). The polymers continue to grow during an induction period, in a relatively fast rate depending on the sot temperature, due to the large concentration of aluminum species. A phase separation into a polymer and solvent rich regions is initiated when the polymers reach a critical size (block 118). The boiling point of the solvent rich phase is now lowered and bubbles which posses high vapor pressure nucleate, expand, rise to the surface and collapse. This situation is gradually stabilized by the increased viscosity of the growing polymers in the polymer rich regions, and the cellular dry material structure is finally set by gelation (which may involve simply aging the structure, block 119), producing a dry, gelled foam (block 120). The foam can then be calcined and/or sintered (both of these steps are optional, blocks 122 and 124) into a ceramic foam (block 126). However, the foam may also be used in the gelled form.

With the above high-level description in mind, the foam production method using the $AlCl_3(Pr^i_2O)$ complex will now be discussed in detail. The existence of $AlCl_3$:ether complexes Is well documented in the literature. The ratio of $AlCl_3$:ether in the complexes is normally 1:1 but can be also 1:2 or 2:1 depending on the nature of the ether. Accost et al. have demonstrated that the addition of isopropyl ether to alumimumtrichloride in dichloromethane results in the formation of the $AlCl_3(Pr^i_2O)$ complex with the formation of ionic species to a small extent, through the following reactions:

Major

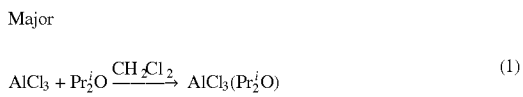 (1)

Minor

 (2)

Accost et al., "Better Ceramics Through Chemistry," J. Sol-Gel Sci.Tech, 1997, (in press). This work was carried under the $AlCl_3/CH_2Cl_2$ molar ratio of 1:3.2.

In the experiments described below, sols were prepared in $AlCl_3CH_2Cl_2$ molar ratios of 1:8.7–1:2.4 (FIG. 1, block 100). $AlCl_3/Pr^i_2O$ molar ratio was taken as 2:3. Solutions were heated in an oil bath at 90° immediately after mixing the reagents to induce fast and reproducible dissolution of $AlCl_3$ (block 102). The clear solutions were removed from the oil bath after 5 min and allowed to cool to room temperature. Depending on concentration, formation of $AlCl_3(Pr^i_2O)$ crystals took place during the cooling after 15–120 minutes (block 106).

The formation of needle like crystals at room temperature was observed at $AlCl_3/CH_2Cl_2$ molar ratios exceeding 1:2.84. The 1:2.84 molar ratio is equivalent to 5.5 mol Al/l $CH_2Cl_2$. Significant increase in crystal yield and decrease in precipitation time (or increase in precipitation temperature) is achieved by increasing the sol concentration. Precipitation of crystals at room temperature began after 2 hours in the 1:2.84 sol while precipitation in the 1:2.4 sol took less than 15 min. The crystals molar ratio was found experimentally to be $AlCl_3:Pr^i_2O=1:1$. Although an optical microscope photograph of the crystals shows a polycrystalline diffraction pattern, facets can be clearly seen. It is important to note that the crystal formation process which involves unhydrolyzed and uncondensed aluminum species In this system is completely different from the formation of crystalline phases of boehmite or bayerite in aqueous sols of alumina. Moreover, the crystallization process is reversible and gels with $AlCl_3$ concentrations exceeding the $AlCl_3/CH_2Cl_2$ molar ratios of 1:2.84 can be obtained by reheating the crystals to a higher temperature than their formation point.

The crystals were separated from their mother liquor by decantation and then dried in vacuum ($10^{-1}$ mmHg) at room temperature for 4 hours. Since the crystals are highly hygroscopic, extra care must be taken to prevent the absorption of atmospheric water. The dry crystals were kept in sealed vials filled with argon at 5° C. until the foaming experiments. All manipulations of crystals were thus carried out under flowing argon, in a glove box filled with argon or in a vacuum.

Foaming experiments for four different heating temperatures (block 110) are discussed below. In the first experiment, the crystals were heated to about 70° C. in the oil-bath. In the second experiment, the foaming process was observed at room temperature by placing the crystals in sealed vials filled with argon at 25° C. In the third experiment, a fast heat treatment profile to 900° C. was carried out. Finally, in the fourth experiment, a slow heat treatment at 150° C. was used.

In the first experiment, approximately one gram of crystals were placed in a sealed 200 ml reactor and then heated to a temperature of 70° C. to accelerate the foam formation. Upon heating of the crystals to temperatures of about 70° C., a liquid phase begins to appear and dissolve the crystals, the crystals become transparent, and some gas is evolved. Subsequently, a homogeneous liquid phase is obtained. At the temperature employed, this step takes several minutes. Depending on the liquid temperature, after few more minutes a massive or slow nucleation of gas bubbles takes place. Bubbles that reach a critical size on the surface collapse. However, further nucleation and foaming continues until the viscosity of the liquid reaches a level that is sufficient to stabilize the foam structure. The time span from the initial bubble nucleation until the full stabilization of the foam structure was 2–4 minutes at 70° C.

An increase in volume by a factor of approximately ten between the liquid and the foamed states has been produced. The foam contains a gas phase embedded in a solid closed-cell foam. Significantly, in contrast to other ceramic foaming processes no further extraction or drying procedures are required, in the present case. The nature of the above process will now be discussed in more detail.

The first stage of the foaming process involves the gradual appearance of a liquid phase accelerated by heating the crystals of the $AlCl_3(Pr^i_2O)$ complex. The gas evolved in a controlled heating of the crystals to 70° C. was analyzed by means of NMR, before a liquid phase has formed. The only volatile species isolated was isopropyl chloride. This result indicates that the $AlCl_3(Pr^i_2O)$ complex is decomposed during heating with the formation of isopropoxy groups and isopropyl chloride (block 112) through the following scheme:

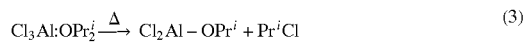

(3)

No traces of isopropyl ether were identified by NMR, indicating that all the remaining isopropyl ether may be attached to the unreacted fraction of the complex. The aluminochloroisopropoxy species formed during the crystal decomposition originates from the same nonhydroytic reactions taking place in dichloromethane as a solvent. The isopropyl chloride evolved in the decomposition of the crystals has a normal boiling point of 35.4° C. In a closed reactor however, or when liberated rapidly, the isopropyl chloride product subsequently dissolves the aluminochloroisopropoxy species formed and the remaining unreacted $AlCl_3(Pr^i_2O)$ complex, producing a homogeneous solution. This solution has a significantly higher boiling point due to the large concentration of aluminum species.

The percent isopropyl chloride found in the gas phase corresponds to approximately 51% of the total isopropyl chloride content that can theoretically form in the system. Assuming this isopropyl chloride content is present initially in the liquid phase, the overall $Al/Pr^iCl$ molar ratio in this solution would be around 1:1, much higher than the $Al/CH_2Cl_2$ molar ratio of 1:2.84 required for the precipitation of crystals. Even if the maximum theoretical value of isopropyl chloride would have been present at this stage, the corresponding minimal $Al/Pr^iCl$ molar ratio must exceed 1:2, since this condition implies that all the aluminum species are completely condensed at this stage. Fully condensed aluminum is expected to be present only in the late calcination stages of the resulting foams. In other words, the $Al/Pr^iCl$ molar ratio must be above 1:2 and is most likely around 1:1. This can be the result of a higher salvation power of isopropyl chloride (compared to dichloromethane), but more likely, it is the result of the better miscibility of the aluminum species containing isopropoxy groups formed during the decomposition of the complex. In fact, solutions of $AlCl_3(Pr^i_2O)$ complex crystals that were dissolved in dichloromethane mother liquor showed increasingly smaller yields of reprecipitated crystals over a period of one month. No precipitation was observed after a period of one month, indicating that the species become more soluble with time. This is consistent with the formation of isopropoxy groups during aging which increases the aluminum species miscibility in dichloromethane.

The formation of a liquid phase is followed by an induction period which is dependent on the liquid temperature (few minutes at 70° C. vs. 1 day at 25° C.). Consistent with the nonhydrolytic chemistry, a homogeneous polymerization takes place at this stage producing Al—O—Al bonds (block 116), according to the following scheme:

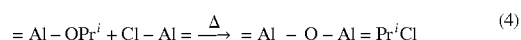

(4)

The polymerization in this system however, occurs much faster than in the corresponding sol-gel processes, due to the high aluminum species concentration. As evident from EQUATION 4, isopropyl chloride is also a product of polymerization. Isopropyl chloride was the only volatile product found in the gas phase after foam formation by NMR and GC analysis. The formation of isopropyl chloride in homogeneous solution would act as to decrease the concentration of polymer species formed during polymerization. Following the induction period, and depending on temperature, an extensive or slow nucleation of bubbles rising to the liquid surface has been observed. The transition of the homogeneous solution to an heterogeneous one may result from the Increase in polymer mass fraction during polymerization. As long as the solvent and growing $AlO_xCl_y(OPr^i)_z$ species are mixed homogeneously, the boiling point of the solution is raised above the boiling point of the pure isopropyl chloride (35.4° C. at 1 atm), and its vapor pressure is low.

As the polymers reach a critical size, the homogeneous polymer solution undergoes a phase separation to a polymer and solvent rich regions (block 118). At this instance, which is recognized as the foaming point, two different processes take place simultaneously in the heterogeneous mixture In the solvent rich region, the solvent expelled is suddenly above its boiling point, or with a significant vapor pressure. Bubbles start nucleating within the solution, expand and rise to the surface, as a result of buoyant forces. As long as the viscosity of the polymer rich regions is low, the expansion, rise, coalescence, growth and collapse of the bubbles continues. However, since the polymer concentration increases upon the formation of a polymer rich region, the rate of polymerization is significantly increased. Thus, the viscosity and surface tension of the polymer rich phase rises rapidly, resulting in much smaller, more stable bubbles. The foam is subsequently stabilized by gelation of the polymer phase (block 120).

The evolution of the isopropyl chloride condensation product during the final stages, should in principle result in the decrease in polymer concentration in the polymer rich regions. However, since the evolution of isopropyl chloride at this stage is directly related to polymer molecular weight increase, and furthermore, a phase separation process is involved, a fraction of the isopropyl chloride formed diffuses to the solvent rich regions. This results in the partial drying of the gelled phase during the foaming process.

Figure 2A:
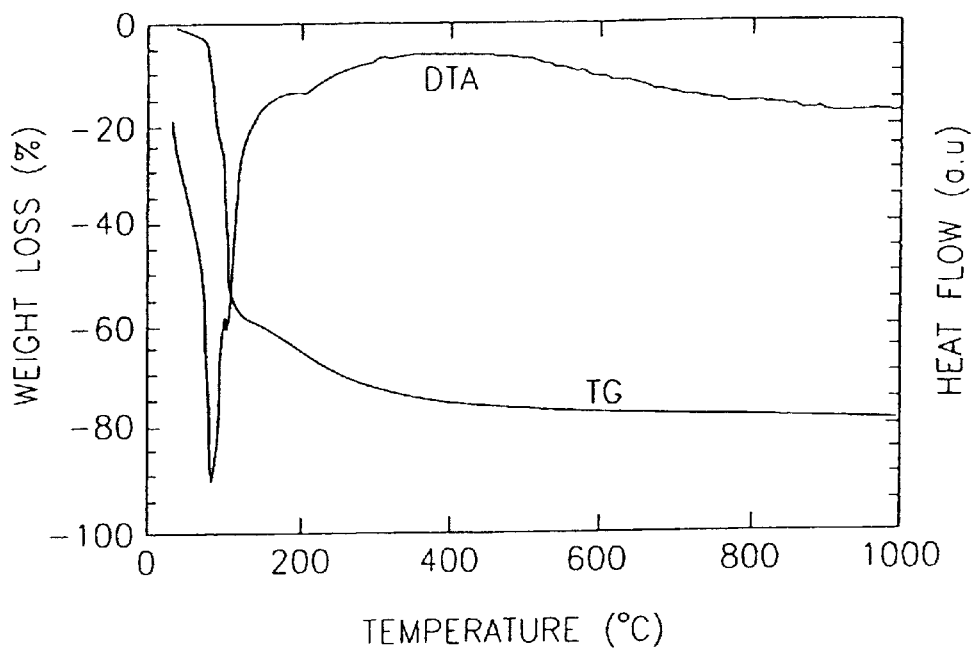
FIGS. 2A, 2B and 3 are graphs illustrating exemplary weight loss characteristics of various implementations of the embodiment of FIG. 1.
Figure 2B:
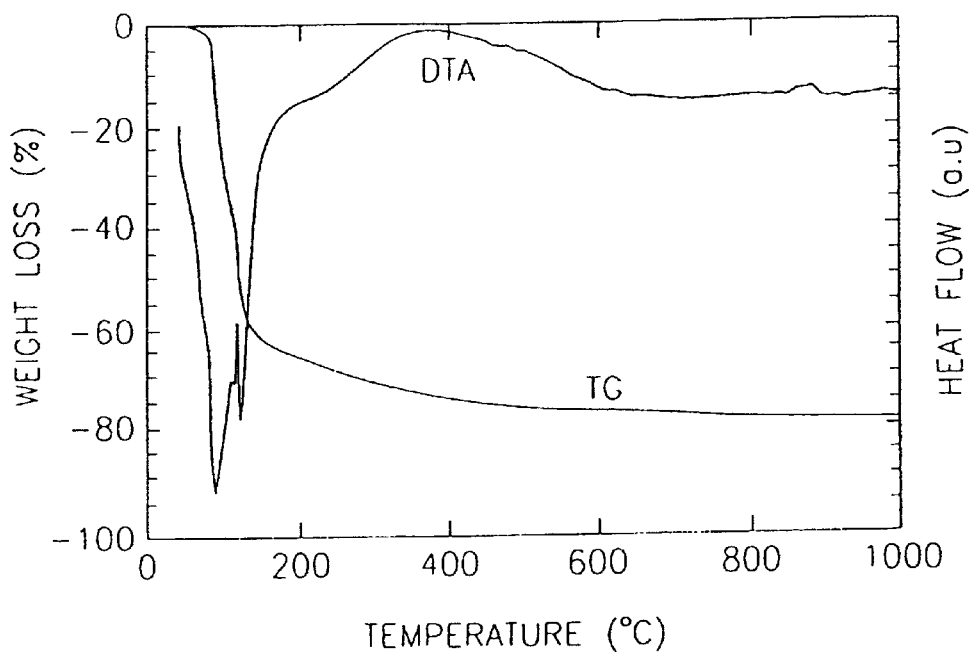

TGA/DTA of the crystals in argon and in air are presented in FIGS. 2A and 2B, respectively. The major weight loss from the crystals (>80% of the total weight loss), both in argon and in air, takes place between 70–150° C. This result indicates that the crystals decomposition starts at temperatures as low as 70° C. and is endothermic. The differences in magnitude of the 220–600° C. exotherm between FIGS. 2A and 2B is attributed to the oxidation of organic residue which occurs in air but does not take place in argon.

In addition, since the $AlCl_3/Pr^i_2O$ ratio is 1:1, there is not sufficient internal oxygen (in the ether) to supply the full $Al_2O_3$ stoichiometry. In order to reach the $Al_2O_3$ composition, it is necessary that the materials derived from the crystals react with atmospheric oxygen during the heating. When air atmosphere is used, the following overall reaction is expected to take place at the 220–600° C. temperature range:

$$AlCl_3(Pr^i_2O) + \frac{1}{4}O_2 \xrightarrow{\Delta} \frac{1}{2}Al_2O_3 + \text{volatiles} \tag{5}$$

The small exothermic peak that appears in FIG. 2B at about 850° C. but absent in FIG. 2A, attributed to the crystallization of $\eta$-$Al_2O_3$, is consistent with EQUATION 3. The calculated weight loss according to EQUATION 3 is:

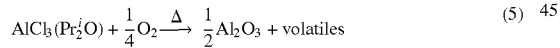

which is in very good agreement with the experimental value of 78.2% obtained from FIG. 2B.

The second experiment illustrates that formation of foams may occur at room temperature. As expected from the high activation energy measured for the corresponding gelation process, the time scale for the foaming process is days rather than minutes. The foaming mechanism at 25° C. is essentially similar to the one at 70° C. The dry crystals were placed in a sealed glass vial and held at 25° C. Clear liquid phase appears after one week at this temperature. Rather than a massive nucleation as encountered at 70° C., only a few nucleation sites are formed initially on the surface in this experiment. The bubbles grow significantly by gas diffusion and subsequently collapse as a result of insufficient surface viscosity. Other nucleation sites appear, which produce one or more bubbles. The general features seen in the early stages of foaming include bubble nucleation, growth by gas diffusion or bubble coalescence, and bubble collapse.

Cell size is in the order of few mm, which is an order of magnitude larger than cell size in the foam obtained at 70° C. This result emphasizes the interplay between temperature, gas pressure and fluid viscosity in determining the final cell size.

Figure 3:
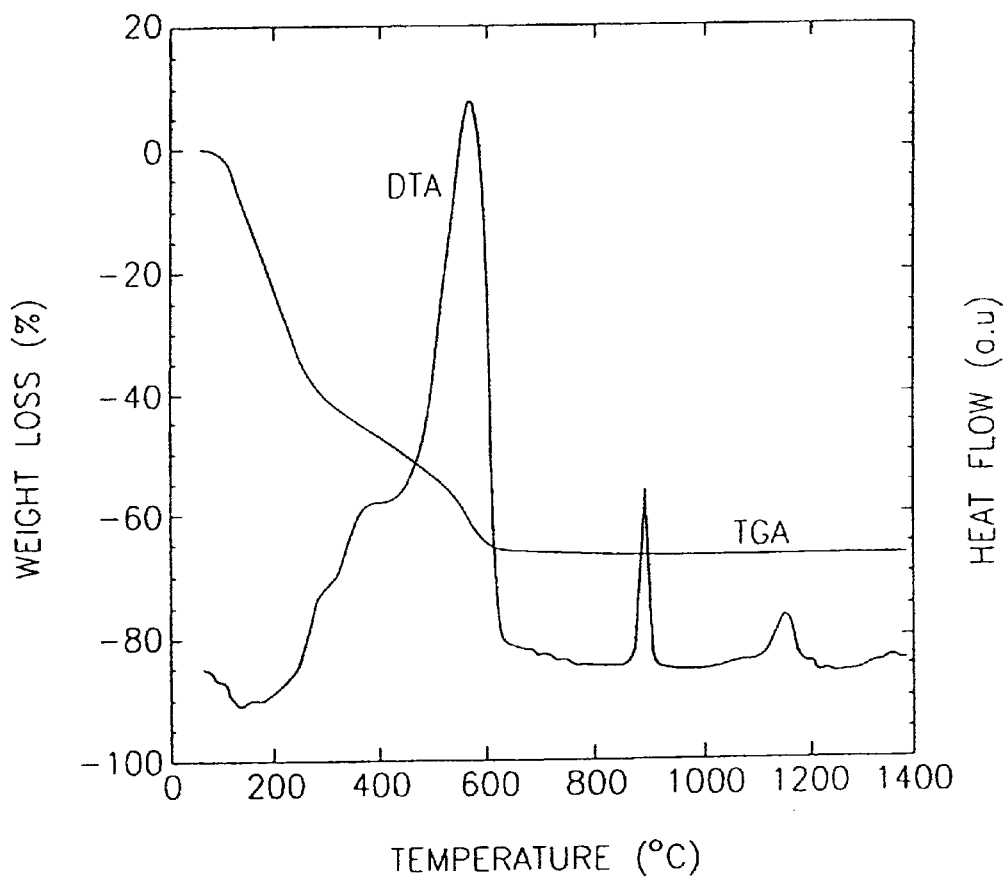

FIG. 3 presents the TGA/DTA curves of the foams produced at 25° C. heated in air. The weight loss up to about 250° C. is about 35.5% of the total of 67.4%, much smaller than for the parent $AlCl_3(Pr^i_2O)$ complex crystals which lose about 70% of the total of 78.3% at this temperature range NMR and GC results show that the only volatile species evolved during the process of foam formation is isopropyl chloride In particular, no isopropyl ether was detected in the gas phase, indicating that all the oxygen remains attached to the aluminum atoms. Starting with the $AlCl_3(Pr^i_2O)$ complex, an overall mass balance over the foaming process can be written in the form of EQUATION 6:

$$AlCl_3(Pr^i_2O) \rightarrow AlOCl_{3-2x}(Pr^i)_{2-2x} + 2xPr^iCl \tag{6}$$

The foam composition, given by EQUATION 6, is subsequently transformed to alumina during calcination in air (block 122) through the following overall reaction which also involves complete oxidation by atmospheric oxygen:

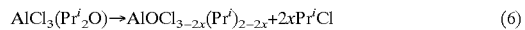

A comparison of the weight loss expected from EQUATION 7 with the experimental TGA result gives an assessment of the volatile isopropyl chloride fraction, denoted by x in EQUATION 6, which is evolved during the foaming process. The weight loss (WL) calculated from EQUATION 7 is given by:

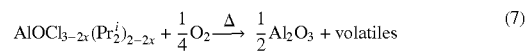

The x value corresponding to the experimental TGA weight loss has been estimated as 0.51 based on the TGA Data in FIG. 3 and EQUATION 8. No significant weight loss is detected in TGA at temperatures below about 100° C, where desorption of physically bound isopropyl chloride is expected to occur. The DTA/TGA curve in FIG. 2B can be roughly divided Into two regimes, the 25–170° C. and the 170–650° C. intervals where the crystals lose 65% and 13% respectively On the other hand, the foams lose 16% and 51% of their initial weight in the same temperature range as seen in FIG. 3. This difference points out to a different reaction pathway of the crystals and the foams.

In the third experiment, a fast heat treatment profile to 900° C. (FH) was carried out at a heating rate of 300° C./h with a three hour soak at 900° C. Further heat treatment of FH materials was performed for one hour at 1500° C. in air.

Heat treatment of the crystals to 900° C. (300° C./h) results in a formation of extremely light monolithic foams. SEM observation has shown that the foam consists mainly of completely closed cells, 50–300 μm in diameter. Several large cells (~500 µm) also appear, possibly due to the collapse of walls separating smaller cells. A few cells may have been broken as a result of mechanical stress during mounting of the samples on the SEM holder. Others may explode as a result of the interaction with the electron beam in the microscope. Average cell thickness is measured by SEM to be 1–2 µm in size, which explains the large macroporosity of the material. The effective density of the foams after treatment at 1500° C. is estimated from the mass/volume ratio to be between 0.05–0.25 g/cm$^3$ which corresponds to 94–99% porosity. For a simple cubic array of hollow spheres, 150 µm in diameter with cell thickness of 1.5 µm and the density of $\alpha$-Al$_2$O$_3$ (4.0 g/cm$^3$), the theoretical porosity obtained is 98%.

The surface area of the FH foams treated in argon (see FIG. 4) is more than 150 m$^2$/g. After additional calcination in air which is accompanied with about 10% weight loss of the carbon containing phase the surface area drops to about 70 m$^2$/g.

The FH foams treated in air show an identical macrostructure as the FH foams treated in argon or foams treated in argon followed by calcination in air (argon/air). However, SEM micrographs of the fractured cell walls of the air treated FH foams, reveal a completely different morphology in the µm scale compared with argon/air treated FH foams. The cell walls of the air treated FH foams consist of an homogeneous nucleation of µm sized inhomogeneities and holes created by the displacement and disattachment of these inhomogeneities. The surface area of FH foams treated in air at 900° C. is only in the order of 10 m$^2$/g, which is an order of magnitude lower than the SH foams or other FH foams at this temperature. Their comparatively low surface area coupled with their µm sized inhomogenieties, indicates that the air treated HT foams contain much smaller microporosity.

While the foam treated at 1500° C. is transformed to $\alpha$-Al$_2$O$_3$ loosing all the microporosity, overall shrinkage of the foam is very small (5±3%). In addition, the special closed cell morphology is retained at this temperature. The cell walls show different stages of sintering (FIG. 1, block 124) and degrees of porosity. The surface area at 1500° C. of 0.5 m$^2$/g is consistent with the average particle size, of about 1 µm in size.

In the fourth experiment, a slow heat treatment at 150° C. (SH) was carried out under argon at a heating rate of 70° C./h with a three hour soak at 150° C. Further heat treatment of SH materials was done at temperatures in the range of 250°–900° C. in air.

Figure 4:
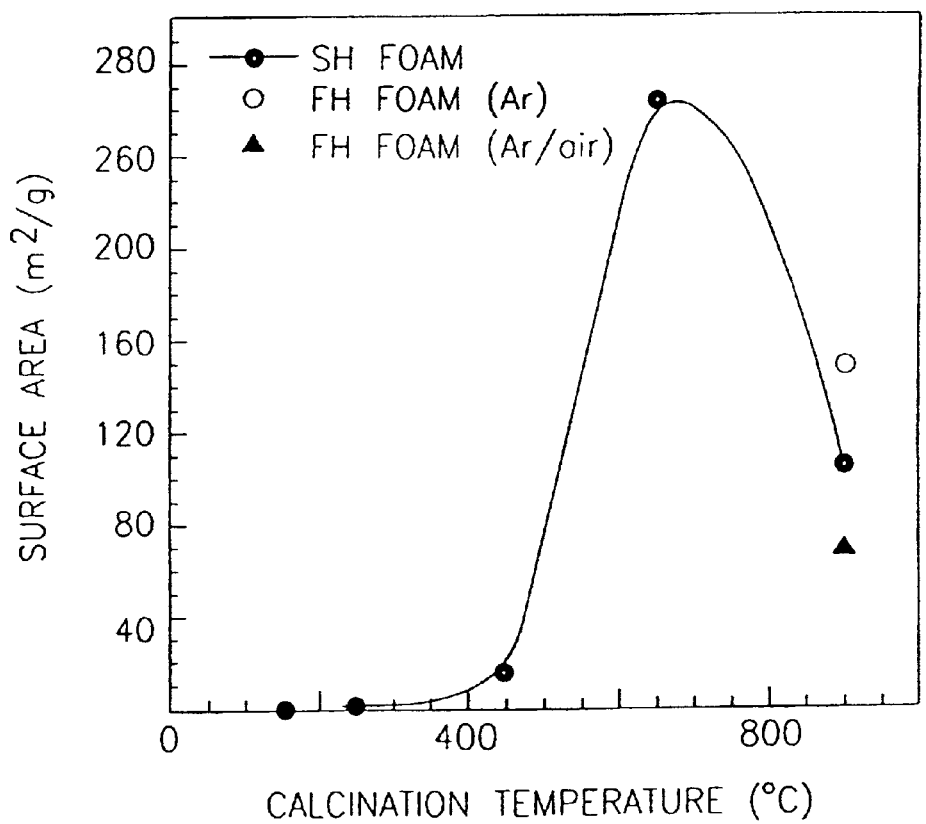
FIG. 4 is a graph illustrating exemplary foam characteristics of the embodiment of FIG. 1.

BET surface area measurements shown in FIG. 4 reveal that the foams can posses a relatively high surface area. The SH foam shows no measurable surface area after formation at 150° C. or after additional heat treatment at 250° C. in air. At higher calcination temperatures the surface area increases and reaches a maximum of 265 m$^2$/g at 650° C. A decrease to 100 m$^2$/g at 900° C. is noticed upon crystallization. The surface area evolution of the foams is very similar to the surface area development of the corresponding xerogels obtained from this system. Furthermore, it indicates that the cell walls posses nanoporosity which is the consequence of the gelation process involved in their formation.

Foams can be obtained directly from sols prepared by mixing AlCl$_3$ with isopropyl ether without the addition of solvent. However, the crystal technique discussed above is preferred for two main reasons. First, the dissolution of AlCl$_3$ in neat isopropyl ether requires high temperatures (or long dissolution times). Therefore the foaming process begins before the dissolution of AlCl$_3$ is complete, giving rise to inhomogeneous foams. Second, since the crystals can be easily handled and stored, only solids are used at all stages of foam preparation rather than reactive and corrosive liquids.

In another embodiment, the precursor consists of an aluminum sec-butoxide and silicon tetrachloride solution. In one experiment, a molar ratio of 1:1 (aluminum:silicon) was used. The solution was heated to 100° C. in a closed vessel. This solution started foaming in approximately ten minutes. At the end of the test, a ceramic foam with a 90–98% porosity was obtained. Unlike the previous embodiment where some or all the precursors were solids, in this case both precursors are liquids.

In this embodiment, the volatile agent is sec-butylchloride. The sec-butylchloride component serves as the blowing agent that creates a foam as the solution gels.

This embodiment illustrates that a release of a volatile component may be achieved with different starting materials. Significantly, in this embodiment, the volatile component originates from the metal precursor, rather than from the ether. Moreover, this embodiment illustrates that different volatile components may provide the blowing agent.

The ceramic foaming processes described above are much simpler than conventional methods with regard to process requirements and control. Process simplicity stems from the fact that all the functions required for foam formation can be embedded in only one precursor. The precursor contains all the necessary foam formation components in such a way that the application of mild heating accelerates its transformation to a solid, dry, foamed material.

The mechanism involves sol-gel chemical reactions and physical processes including phase separation and foaming due to evolution of a volatile reaction product during inorganic gelation. In the AlCl$_3$—isopropylether system, the decomposition of the crystals of the AlCl$_3$(Pr$^i_2$O) complex leads to the formation of isopropyl chloride and aluminochloroisopropoxy species, both not present initially. Foam formation is made possible by the inherent duality of the roles played by these two products. Isopropyl chloride takes the dual role of the solvent and the foaming agent present in the solvent rich phase after phase separation, while the aluminochloroisopropoxy species take the dual role of the polymerizing species giving rise to microphase separation (and additional isopropyl chloride) and the gelling/setting agents present in the polymer rich phase after phase separation. Moreover, the duality of the components, which change their role at the foaming point, where phase separation takes place, results in three simultaneous processes, namely foaming, gelling and drying. The net result is a foamed, stabilized, dry material.

While conventional foaming mechanisms may utilize one or more of the above processes, no analog mechanism exists in the organic, ceramic or metal foam production processes. Moreover, given sufficient starting materials, the resulting foams fill the foaming vessel and resemble its shape. Since the foaming, gelling and drying processes occur simultaneously the foams can be prepared in situ in a mold, for example, cylinders or pipes to produce foams in complicated shapes (FIG. 1, block 108).

From the above, it may be seen that the invention provides improved ceramic foams with exceptionally high porosity. While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur.

For example, a variety of combinations of compounds may be used for the precursor. The ceramic-forming material may include one or more of the elements such as Al, Ti, Zr, Si, V, Zn or Fe that are combined with a halide and an oxygen donating molecule including ethers, alkoxides, ketones, aldehydes, esters or any combinations thereof. Where the latter may be combined with the element above at any ratio.

Various ratios may be used for the compounds as well. Typical Al:Pr$^i_2$O molar ratio may be between 1:0.1 and 1:10. Preferably, the Al:Pr$^i_2$O molar ratio is between 1:0.5 to 1:3. Typical Al:Si molar ratio may be between 1:0.1 and 1.10. Preferably the Al:Si molar ratio is between 1:0.25 and 1:4.

Furthermore, various organic or inorganic fillers such as powders, ceramic fibers, polymeric fibers, composite fibers, or organic additions may be added to the foam precursors at any stage of the foaming process (see, for example, block 104) to affect various mechanical, physical and chemical foam properties. For example, silicon carbide fibers may be added to strengthen the foam. See the Fujiu et al. and Wu et al. articles referenced above, the contents of which are hereby incorporated herein by reference. In addition, oxide fibers such as $SiO_2$ fibers may be used as fillers. Also, an organic polymer (or polymers) such as QPAC sold by Pac Polymers may be used.

Also, various heating and foam forming techniques may used in the practice of this invention. Thus, the specific structures and methods discussed in detail above are merely illustrative of a few specific embodiments of the invention.

The foam formed by the techniques described hereinabove is a "closed" cell foam, that is the "walls" separating the various cells of foam are solid or closed. It will be appreciated by persons skilled in the art that the foam forming technique may be adapted to be also applied to forming an "open" cell foam.

This technique uses depressurizing to obtain an open-cell foam. As the pressure difference ($\Delta p$) between the initial and final stages of process increases, the foam has a more "open" cell structure. The type of foam that is produced is also dependent on several other variables, such as the molecular weight, the viscosity, the amount of isopropyl chloride and organic or inorganic additives which may be added.

Figure 5:
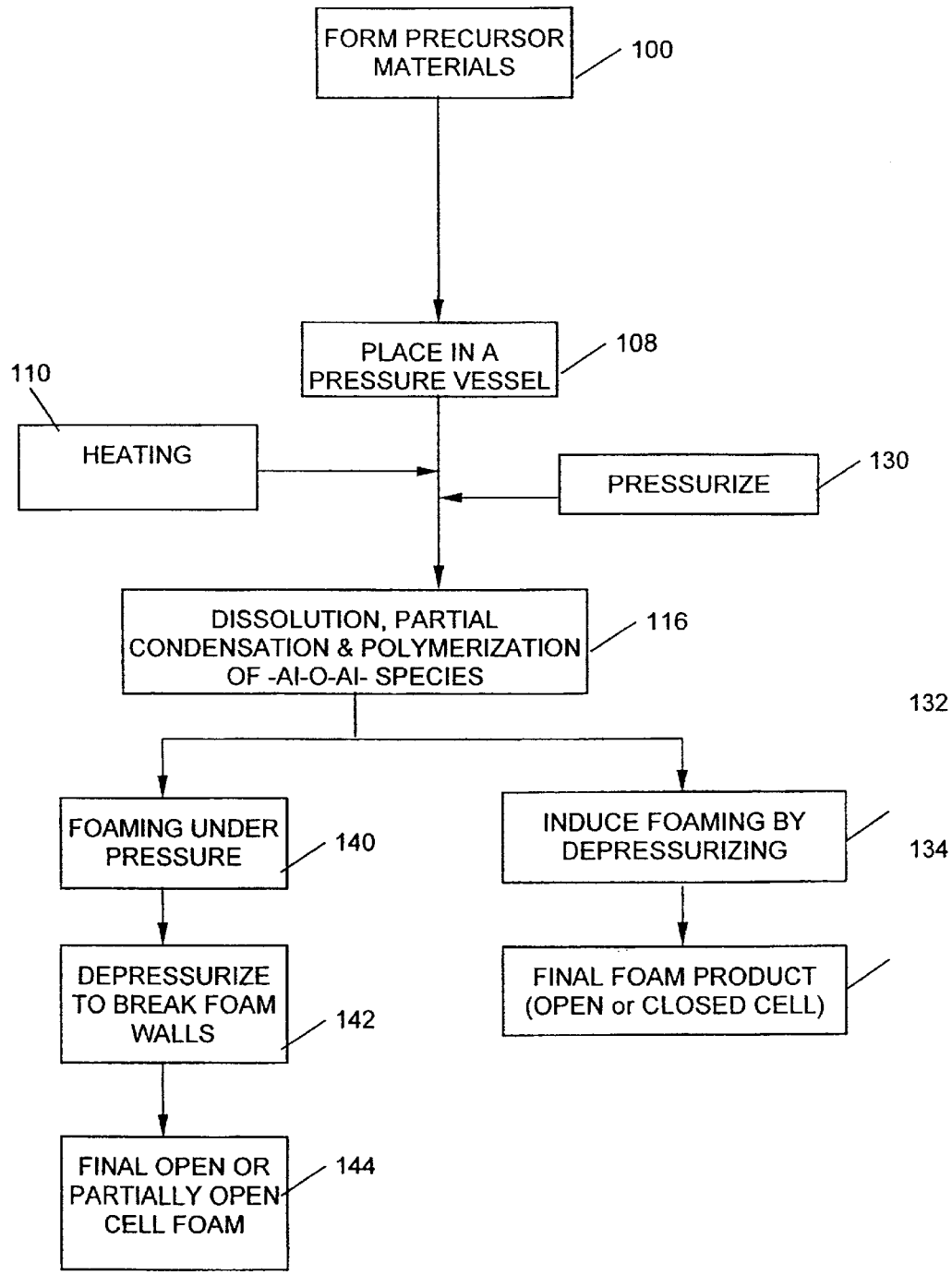
FIG. 5 is a flow chart illustration summarizing the stages involved in the mechanism of an open-cell or partially open cell foam formation.

Reference is now made to FIG. 5 which is a flow chart illustration which summarizes the stages involved in the mechanism of an open-cell or partially open cell foam formation.

The process of FIG. 5 is similar to the process described hereinabove with respect to FIG. 1. Elements of this embodiment of the invention which are similar to elements which have been previously described with respect to the preferred embodiment hereinabove, are similarly designated and will not be further described. The AlCl$_3$(Pr$^i_2$O) complex or crystals thereof are used as the precursor (block 100). The container containing the AlCl$_3$(Pr$^i_2$O) complex is placed in a pressure vessel (block 108) and pressurized. The pressure vessel is then heated (block 110) to accelerate the transformation of the complex to a solution of isopropyl chloride and partially condensed Al—O—A— species (block 116). The temperature equilibration varies, depending on the pressure vessel. The foaming times varies depending on the temperature (for example, about 10 minutes at 80° C.).

There are two alternative methods of producing the foam, either depressurizing after foaming (steps 140–144) or depressurizing before foaming (steps 132, 134):

The first alternative is to depressurize after foaming (steps 140–144) which can break down the original cell walls due to gas expansion thus providing an open-cell material. If the cell walls do not break the foam will expand and contain larger cells. Often, especially during a large pressure drop ($\Delta p$), new and larger cells are obtained which mostly have an open structure.

In this method, phase separation and foaming occur under pressure (step 140) after the polymer reaches a critical size. The foam is stabilized by gelaton. Depressurizing the vessel causes the cells walls in the foam to break thereby providing an open-cell foam. The rapid drop in pressure breaks down the walls between the cells and expands the structure, thus giving rise to an open or partially open structure (step 144). Open-cell structures are particularly useful for filters and catalyst supports, for example.

In the second alternative (steps 130, 134), depressurizing takes place before foaming. Since the boiling temperature of the isopropyl chloride fluid is raised under pressure, the depressurizing step can trigger foaming in the vessel (block 132). Following the depressurization and cooling to room temperature the final foam is obtained. Depending on the conditions the foam produced may be either closed cell or open cell, partially open cell.

The foam is then removed from the container and heat treated to form a foam having an open cell or closed cell structure and porosity of approximately 94–98% (block 134). The significance of this alternative method is the ability to initiate foaming at a specific time (on demand). Depending on the depressurizing conditions temperature and molecular weight of the Al—O—Al— species; the foam may be closed open or partially open cell structure.

Partially Open-cell Experiment 1. 1 gram of the A1C13-ether complex was placed into a container.

2. The container was placed into a pressure vessel and externally pressurized to 2 atmospheres using nitrogen gas.

3. The pressure vessel was Immersed into an oil bath that was preheated to 70–150° C.

4. After 15 minutes, temperature equilibration took place.

5. Following the foaming the vessel was depressurized and cooled to room temperature.

6. The foam was removed from the vessel and heat treated up to 600° C. in argon and then up to 800° C. in air.

The final porosity of the foam was 95–98%, and a partially open cell morphology was observed.

By varying the pressure it was found that below 6 atmospheres the foaming process occurs as usual except that under pressure the cells are much smaller than those obtained in an open vessel. Above 6 atmospheres no foaming is observed at the end of the depressurizing step. The material appears as a film on the bottom of the container. The foaming is obtained after re-heating the crucible at atmospheric pressure.

Partially opened cells can be obtained by firing the initial foam in air rather than in argon (or nitrogen). Which causes holes in the cell walls that connect adjacent cells.

Figure 6:
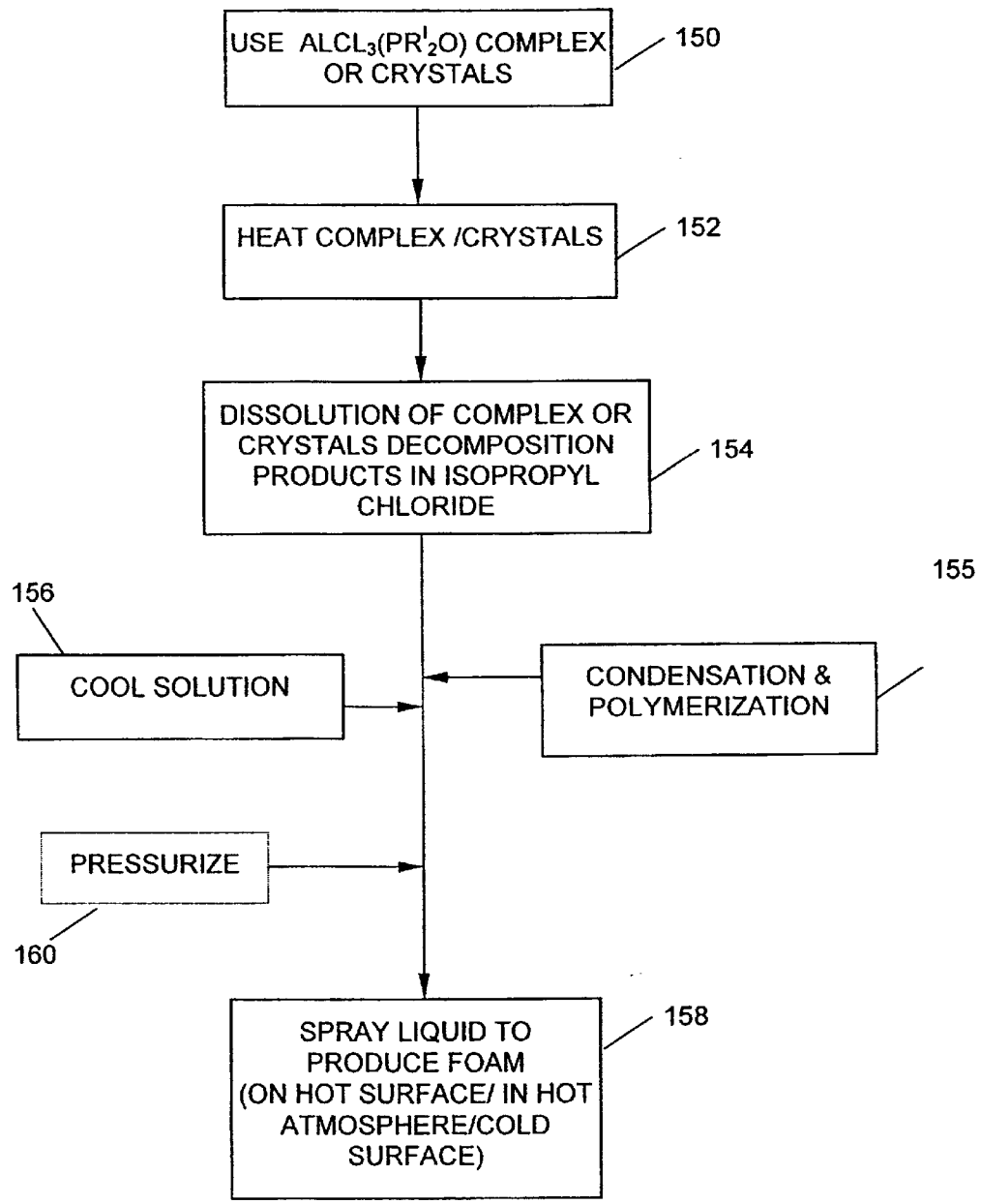
FIG. 6 is a flow chart illustration of the steps involved in the production of a thermal insulator.

The ceramic foam described above is useful in numerous practical applications. For example, ceramic foam can be used as a thermal insulator. The production of a thermal insulator is now described with reference to FIG. 6, which is a flow chart illustration of the steps involved.

The AlCl$_3$(Pr$^i_2$O) complex (formed as described hereinabove with respect to FIG. 1) are heated (block 150).

Heating of the AlCl$_3$(Pr$^i_2$O) complex causes isopropyl chloride to be liberated, forming the solvent of the system (block 152) (similar to block 112 of FIG. 1). Increased solubility of the aluminum species in the isopropyl chloride results in the formation of isopropoxy side groups which enhances their dissolution in the R-Cl reaction product (block 154) (similar to block 114 of FIG. 1). Condensation and polymerization (block 155) takes place.

The solution is then cooled (block 156) to slow down the condensation reaction and delay the foaming. Cooling can be initiated as required to control the condensation depending on the application. The solution can then be sprayed on to a hot surface (block 158) to produce the foam in-situ. The solution can also be pressurized (optional step 160) and then sprayed on to a hot surface or into a hot atmosphere to induce the foam process.

Alternatively, the solution can then be sprayed on to a cold surface which subsequently heated.

In addition to using the foam to create new insulation, the solution can also be used for repairing existing and damaged areas of insulation and is particularly suitable for use in areas having difficult access such as cracks within existing furnace insulation. The foam can also be used as an acoustic barrier.

What is claimed is:

1. A method of producing ceramic foam comprising decomposing a precursor comprising a $AlCl_3$ ($Pr^i_2O$) complex to form a homogeneous mixture of a polymerizing species and liquid isopropyl chloride allowing polymerization to take place until a critical polymer size is attained and phase separation occurs, foaming the mixture and sintering and/or calcining the foam to produce the ceramic foam.

2. The method of claim 1 wherein said precursor comprises $AlCl_3(Pr^i_2O)$ complex crystals.

3. The method of claim 1 wherein said precursor comprises a solution or sol of the $AlCl_3(Pr^i_2O)$ complex.

4. The method of claim 1 further comprising the step of heating said precursor to accelerate formation of said ceramic foam.

5. The method of claim 1 comprising the step of calcining said ceramic foam.

6. The method of claim 1 comprising step of sintering said ceramic foam.

7. The method of claim 1 further comprising the step of placing said precursor in a mold to provide a molded ceramic foam.

8. The method of claim 1 further comprising the step of storing said precursor for future use at a temperature below room temperature.

9. The method of claim 1 further comprising the step of incorporating at least one filler into the foam.

10. The method of claim 1 further comprising the step of adding a compound selected from the group of fillers consisting of ceramic fibers, polymeric fibers, composite fibers and combinations thereof.

11. The method of claim 1 further comprising the step of aging said foam.

12. The method of claim 1 wherein said precursor comprises a $AlCl_3(Pr^i_2O)$ complex with $Al:Pr^i_2O$ molar ratio between 1:0.1 and 1:10.

13. The method of claim 1 wherein said precursor comprises a $AlCl_3(Pr^i_2O)$ complex with $Al:Pr^i_2O$ molar ratio between 1:05 to 1:3.

14. The method of claim 1 and further comprising the steps of:

placing said precursor in a pressure vessel;

heating and pressurizing said precursor to accelerate the transformation of the complex to a solution of isopropyl chloride and partially condensed Al—O—Al species.

15. The method of claim 14 and further comprising the steps of:

foaming under pressure; and depressurizing said pressure vessel, wherein said depressurizing causes at least one of a group of actions to take place including the breaking down of the walls of said foam and the expansion the walls of said foam and the creation of new cells.

16. The method of claim 15 wherein said foam is stabilized by gelation.

* * * * *